US009410225B2

(12) United States Patent
Salomon-de-Friedberg et al.

(10) Patent No.: US 9,410,225 B2
(45) Date of Patent: Aug. 9, 2016

(54) PROCESS FOR RECOVERY OF COPPER FROM ARSENIC-BEARING AND/OR ANTIMONY-BEARING COPPER SULPHIDE CONCENTRATES

(71) Applicants: Teck Resources Limited, Vancouver (CA); Aurubis AG, Hamburg (DE)

(72) Inventors: Henry Salomon-de-Friedberg, Richmond (CA); Hee Mun Jang, Richmond (CA)

(73) Assignees: Teck Resources Limited, Vancouver, British Columbia (CA); Aurubis AG, Hamburg (DE)

(*) Notice: Subject to any disclaimer, the term of this patent is extended or adjusted under 35 U.S.C. 154(b) by 340 days.

(21) Appl. No.: 14/276,692

(22) Filed: May 13, 2014

(65) Prior Publication Data

US 2015/0329937 A1    Nov. 19, 2015

(51) Int. Cl.
| | |
|---|---|
| *C22B 3/00* | (2006.01) |
| *C22B 15/00* | (2006.01) |
| *C22B 3/08* | (2006.01) |
| *C22B 1/11* | (2006.01) |
| *C22B 30/02* | (2006.01) |
| *C22B 30/04* | (2006.01) |
| *C22B 3/26* | (2006.01) |
| *C22B 1/00* | (2006.01) |
| *C22B 3/06* | (2006.01) |

(52) U.S. Cl.
CPC .............. *C22B 15/0067* (2013.01); *C22B 1/00* (2013.01); *C22B 1/11* (2013.01); *C22B 3/0005* (2013.01); *C22B 3/06* (2013.01); *C22B 3/08* (2013.01); *C22B 15/00* (2013.01); *C22B 15/0071* (2013.01); *C22B 30/02* (2013.01); *C22B 30/04* (2013.01); *Y02P 10/236* (2015.11)

(58) Field of Classification Search
None
See application file for complete search history.

(56) References Cited

U.S. PATENT DOCUMENTS

| | | | |
|---|---|---|---|
| 5,223,024 A | 6/1993 | Jones | |
| 5,232,491 A | 8/1993 | Corrans et al. | |
| 5,316,567 A | 5/1994 | Jones | |
| 5,431,788 A | 7/1995 | Jones | |
| 5,645,708 A | 7/1997 | Jones | |
| 5,855,858 A | 1/1999 | Jones | |
| 5,869,012 A | 2/1999 | Jones | |
| 5,874,055 A | 2/1999 | Jones | |
| 5,902,474 A | 5/1999 | Jones | |
| 5,917,116 A | 6/1999 | Johnson et al. | |
| 5,993,635 A | 11/1999 | Hourn et al. | |
| 6,054,105 A | 4/2000 | Jones | |
| 6,171,564 B1 | 1/2001 | Jones | |
| RE37,251 E | 7/2001 | Jones | |
| 6,383,460 B2 | 5/2002 | Jones | |
| 6,455,019 B2 | 9/2002 | Jones | |
| 6,471,849 B1 | 10/2002 | Jones | |
| 6,676,909 B2 | 1/2004 | Marsden et al. | |
| 6,755,891 B2 | 6/2004 | Jones | |
| 7,169,371 B2 | 1/2007 | Jones | |
| 7,341,700 B2 | 3/2008 | Marsden et al. | |
| 7,438,874 B2 | 10/2008 | Jones et al. | |
| 8,025,859 B2 | 9/2011 | Jones | |
| 8,163,063 B2 | 4/2012 | Manabe | |
| 2005/0126923 A1 | 6/2005 | Marsden et al. | |
| 2008/0216606 A1 | 9/2008 | Marsden et al. | |
| 2011/0283838 A1 | 11/2011 | Jones et al. | |

FOREIGN PATENT DOCUMENTS

| | | |
|---|---|---|
| CA | 2377779 C | 6/2008 |
| WO | 9641026 A1 | 12/1996 |
| WO | 03048400 A2 | 6/2003 |

OTHER PUBLICATIONS

Hackl, et al., "Effect of sulfur-dispersing surfactants on the oxygen pressure leaching of chalcopyrite", Proceedings of Copper 95-Cobre 95 Internation Conference, vol. III—Electrorefining and Hydrometallurgy of Copper, 1995, pp. 559-577.*
Bruce, R. et al. "Unocking Value in Copper Arsenic Sulphide Resources with the Copper—Arsenic CESL Technology." Hydrocopper Conference Proceedings, 2011, 12 pages.
International Search Report for PCT/CA2015/050317, dated Jul. 22, 2015, 11 pages.
Pease, J.D. et al., "Fine Grinding as Enabling Technology—The IsaMill," Xstrata Technology, Xstrata—Mount Isa Mihnes; Crushing and Grinding, 2005, pp. 1-21.
Hurtado-Guzman et al., "Technical Options for the Treatment of High Arsenic Concentrates. Pyro-Metallurgy v/s Hydro-Metallurgy, the Well Known and Classical Dilemma," Hydrocopper, 2009, pp. 26-36, vol. 26, Antofagasta, Chile.
Riveros, P.A., et al., "Studies on the Leaching of Tennantite, Tetrahedrite and Enargite in Acidic Sulphate and Chloride Media," CANMET-MMSL, Ottawa, Canada, presented at METSOC's Cu2007 The John E. Dutrizac International Symposium on Copper Hydrometallurgy, Incorporating the 37th Annual Hydrometallurgy Meeting (in Session 62: Technology Development II), vol. IV, Book 2, pp. 313-331.
Clark, L.W. et al., "Fine Grinding and Project Enhancement," Xstrata Technology, Innovative Mineral Developments Symposium, 2004, pp. 1-18.
Barr, et al., "CESL Copper Process—an Economic Alternative to Smelting," Intermin, 2005, pp. 1-13.
Bolorunduro, S.A., et al.,"Fundamental Study of Silver Deportment During the Pressure Oxidation of Sulphide Ores and Concentrates," Minerals Engineering, 2003, pp. 695-708, vol. 16.
Balaz, P., et al., "Attrition Grinding and Leaching of Enargite Concentrate," Metallwissenschaft und Technik, Jan. 1999, pp. 53-56, vol. 53 (1-2).

* cited by examiner

*Primary Examiner* — Steven Bos
(74) *Attorney, Agent, or Firm* — Schwabe Williamson & Wyatt

(57) ABSTRACT

A process for the extraction of copper from a feed material comprising at least one of arsenic and antimony-bearing copper sulphide minerals is provided. The process includes fine-grinding the feed material and after fine-grinding, subjecting the feed material to pressure oxidation in the presence of surfactant and a halogen to produce a product slurry. The process also includes subjecting the product slurry to liquid/solid separation to obtain a pressure oxidation filtrate and solids comprising at least one of a compound of arsenic and a compound of antimony, and recovering copper from the pressure oxidation filtrate.

20 Claims, 5 Drawing Sheets

PROCESS FOR RECOVERY OF COPPER FROM ARSENIC-BEARING AND/OR ANTIMONY-BEARING COPPER SULPHIDE CONCENTRATES

TECHNICAL FIELD

The present disclosure relates to the hydrometallurgical treatment of metal concentrates containing appreciable amounts of copper-arsenic-sulphide mineral.

BACKGROUND

As low impurity copper concentrates are gradually exhausted and less readily available, greater attention is directed at arsenic-bearing copper ore bodies. This results in an increasing arsenic level in the average copper concentrates that are purchased by smelters. With time, arsenic levels are projected to rise to even higher levels. Due to current limitations on arsenic abatement technology, smelters have an upper limit of average arsenic levels in copper concentrate that is rapidly being approached.

Arsenic in some copper concentrates is found in the mineral arsenopyrite (FeAsS) in which physical separation of arsenic from copper is possible. However, more typically, arsenic in sulphide copper concentrates is present principally in the following minerals:

Enargite $Cu_3AsS_4$
Tennantite $Cu_{12}As_4S_{13}$
Tetrahedrite $Cu_{12}Sb_4S_{13}$ Substitution of some of the copper with iron and substitution of antimony with arsenic within these mineral structures is common. These compounds show that physical separation of arsenic from the copper is not possible because both elements are bound within the same chemical lattice structure. Chemical separation, such as leaching, separates arsenic from copper, but both enargite and tennantite are resistant to chemical attack.

Numerous hydrometallurgical processes have been developed to treat concentrates that are principally chalcopyrite-containing copper concentrates. These hydrometallurgical processes include, for example:

Low temperature processes (<110° C.): for example, the Albion, the Galvanox, and the INTEC Processes;
Medium temperature processes (130 to 170° C.): the Anglo American-UBC Process, the CESL Copper Process, the Dynatec Process, and Freeport McMoran (Phelps Dodge) Process;
High temperature processes (>200° C.): Total Pressure Oxidation and PLATSOL Processes.

When applied to sulphosalt-containing copper concentrates, all of the above processes suffer drawbacks. In the low temperature processes, the leaching kinetics of the arsenic (As) and antimony (Sb) sulphominerals that contain copper (Cu) are slower than for the copper-containing chalcopyrite mineral. Consequently, leaching times are impractically long and coincide with incomplete copper recoveries from the sulphosalt minerals. For the medium temperature processes, copper recoveries under the specified conditions are compromised as well.

In the case of the high temperature processes, good copper leaching is achievable in a reasonable time frame. However, the nearly complete extent of sulphur (S) oxidation, forming acid, results in a costly process that requires more neutralizing agent for the additional acid generated, and produces high volumes of residue for which specialized storage is required.

Thus, in each of the hydrometallurgical processes referred to above, the recovery of copper from sulphosalt-containing copper concentrates is uneconomical.

Improvements in the recovery of copper from copper sulphide concentrates containing arsenic and recovery of copper from copper sulphide concentrates containing antimony are desirable.

SUMMARY

According to an aspect of the present invention, Cu extraction from a sulphosalt-bearing Cu concentrate is achieved at a higher rate by comparison to low temperature processes and medium temperature processes while appreciably less of the sulphide mineral is oxidized to the sulphate form by comparison to high temperature processes. Consequently, processing of feed material such as concentrates, to recover copper from chalcopyrite-containing copper concentrates is more economical.

According to one aspect of the invention, a process for the extraction of copper from a feed material comprising at least one of arsenic and antimony-bearing copper sulfide concentrate is provided. The process includes fine-grinding the feed material and after fine-grinding, subjecting the feed material to pressure oxidation in the presence of surfactant and a halogen to produce a product slurry. The process also includes subjecting the product slurry to liquid/solid separation to obtain a pressure oxidation filtrate and solids comprising at least one of a compound of arsenic and a compound of antimony, and recovering copper from the pressure oxidation filtrate.

The process may include subjecting part of the pressure oxidation filtrate to evaporation after recovering copper therefrom and, after evaporation, recycling the part of the pressure oxidation filtrate to pressure oxidation.

The solids from the liquid/solid separation also comprise copper, and the solids, after liquid/solid separation, may be subjected to acidic leaching to dissolve at least some of the copper to produce a copper solution and a solid residue comprising at least one of the compound of arsenic and the compound of antimony. The copper is further recovered from the copper solution.

The feed material may be subjected to fine grinding to a p80 of about 5 μm to about 15 μm. The feed material may be subjected to fine grinding to a p80 of about 7 μm to about 10 μm.

The surfactant in the pressure oxidation may be added in an amount of about 1 kg/t concentrate to 10 kg/t concentrate and may include at least one of lignin sulphonate, quebracho, aniline, o-phenylenediamine. The surfactant may be o-phenylenediamine in an amount of 1.5 to 3 kg/t concentrate.

The process according to claim 1, wherein the halogen may be chloride at a concentration of about 3 to 20 g/L chloride. The halogen may be chloride at a concentration of about 10 to 12 g/L chloride.

Pressure oxidation may be effected at a temperature of about 140° C. to about 160° C. Pressure oxidation may be effected with a retention time of about 60 to about 120 minutes. Pressure oxidation may be effected at an oxygen partial pressure of about 700 to about 1400 kPa. Pressure oxidation may be effected in the presence of a feed acid comprising sulphuric acid in an amount sufficient to limit the oxidation of sulphur in the feed material to sulphate.

A ratio of arsenic to iron in the combined feed to pressure oxidation including the feed material, surfactant, and halogen, and not including recycled residue, may be less than 0.1:1 or between 0.7:1 and 1.3:1.

Pressure oxidation may be effected in the presence of up to 5 kg/t of potassium iodide.

Part of the solids obtained from the liquid/solid separation may be recycled to the pressure oxidation at a solids to fresh concentrate ratio of about 0.1:1 to 1.5:1.

DRAWINGS

Embodiments of the present invention will be described, by way of example, with reference to the drawings and to the following description, in which.

DETAILED DESCRIPTION

Figure 1:
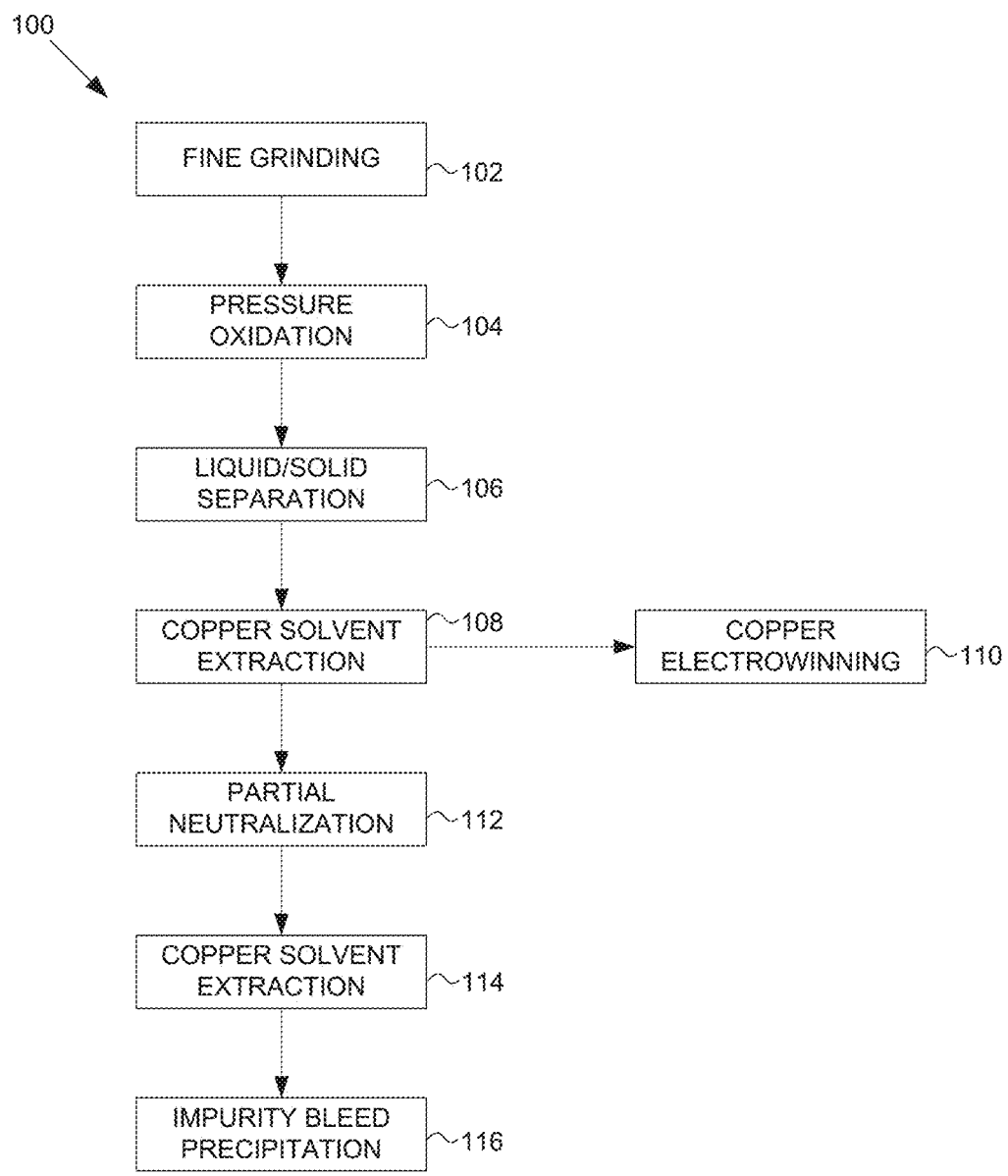
FIG. 1 is a simplified flow chart illustrating a process for recovery of copper from arsenic-bearing or antimony-bearing sulphide concentrates according to an embodiment.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to a process for the extraction of copper from a feed material comprising at least one of arsenic and antimony-bearing copper sulphide minerals. The process includes fine-grinding the feed material and subjecting the finely-ground feed material to pressure oxidation in the presence of surfactant that is utilized as a sulphur dispersant, and a halogen that is utilized as a lixiviant, to produce a product slurry. The process also includes subjecting the product slurry to liquid/solid separation to obtain a pressure oxidation filtrate and solids comprising at least one of a compound of arsenic and a compound of antimony. Copper is recovered from the pressure oxidation filtrate prior to recycling a part of the filtrate.

Throughout the disclosure, reference is made to arsenic-bearing copper minerals to refer to copper minerals bearing more arsenic than antimony. Arsenic-bearing copper minerals also include some antimony, however. Similarly, the term antimony-bearing refers to copper minerals bearing more antimony than arsenic. Further, although the process is described with reference to arsenic-bearing copper minerals, because of similar chemical properties of the antimony, similar results are generally expected for treatment of antimony-bearing copper minerals when utilizing the process described herein.

Referring to FIG. 1, a flow chart illustrating a process for recovery of copper from arsenic-bearing or antimony-bearing sulphide concentrates is indicated generally by the numeral 100. The process may contain additional or fewer processes than shown and described, and parts of the process may be performed in a different order.

The process 100 is carried out to extract copper from refractory arsenic-bearing copper minerals such as enargite and tennantite. The process may result in precipitation of arsenic within the autoclave into a stable form for disposal, and relatively low sulphur oxidation. Arsenic precipitation within the autoclave generally produces a more stable and therefore more desirable arsenic residue. Lower sulphur oxidation reduces reagent consumption such as oxygen and neutralizing agents as well as the size of plant equipment such as the oxygen plant and the size of the autoclave, which is influenced by heat generation considerations that are strongly influenced by the extent of sulphur oxidation.

Feed material, which may comprise concentrate that includes one or both of arsenic-bearing copper sulphide minerals and antimony-bearing copper sulphide minerals, is finely ground at 102 to enhance copper extraction. The feed material also includes other minerals such as, for example, pyrite and chalcopyrite. The finely ground feed material is then processed by pressure oxidation in an autoclave at elevated temperature at 104. The pressure oxidation at 104 is carried out in the presence of a surfactant and a halogen, such as chloride or bromide, where the sulphide-bearing minerals are oxidized resulting in a product slurry. The bulk of the copper deports to solution and majority of arsenic dissolves and subsequently precipitates within an iron oxide matrix.

The product slurry discharged from the autoclave is depressurized and cooled and is subjected to liquid/solid separation at 106 that produces a washed iron-rich residue that includes one or both arsenic and antimony that may be discarded or may be subsequently processed for recovery of precious metals values. The liquid/solid separation at 106 also produces a copper-rich filtrate, also referred to as a copper-rich leach liquor, that is subjected to copper solvent extraction at 108 where copper is loaded onto and then stripped from a circulating organic phase. Partial pre-neutralization may be utilized to reduce acid levels to maintain an efficient solvent extraction operation. The stripped and purified copper is recovered by copper electrowinning 110.

The solvent extraction at 108 exchanges acid for copper in the filtrate. The resulting aqueous raffinate is recycled to the pressure oxidation at 104 to leach additional copper. Because some the sulphur present in the feed material is converted to sulphuric acid within the autoclave, a portion of the raffinate stream is diverted for neutralization where excess acid produced in the autoclave is neutralized at 112, for example, with limestone to produce gypsum.

Readily soluble impurities, such as zinc for example, are bled from the process to inhibit the concentration of such impurities from climbing to unacceptable levels. To bleed the impurities, a portion of the neutralized raffinate flow is directed to a secondary solvent extraction step at 114 where the copper in the bleed solution is removed to an economically acceptable low level. The organic phase that extracts this copper is returned to the primary solvent extraction at 108 where the copper is recovered and sent on to the copper electrowinning step. The pH of the copper-depleted aqueous stream is then increased, for example, using lime, to facilitate precipitation of the impurities at 116. This precipitation at 116, and subsequent liquid/solid separation, produces a bleed residue. The product solution is suitable for recycle and is used for washing of the iron residue in the upstream liquid/solid separation at 106.

Figure 2:
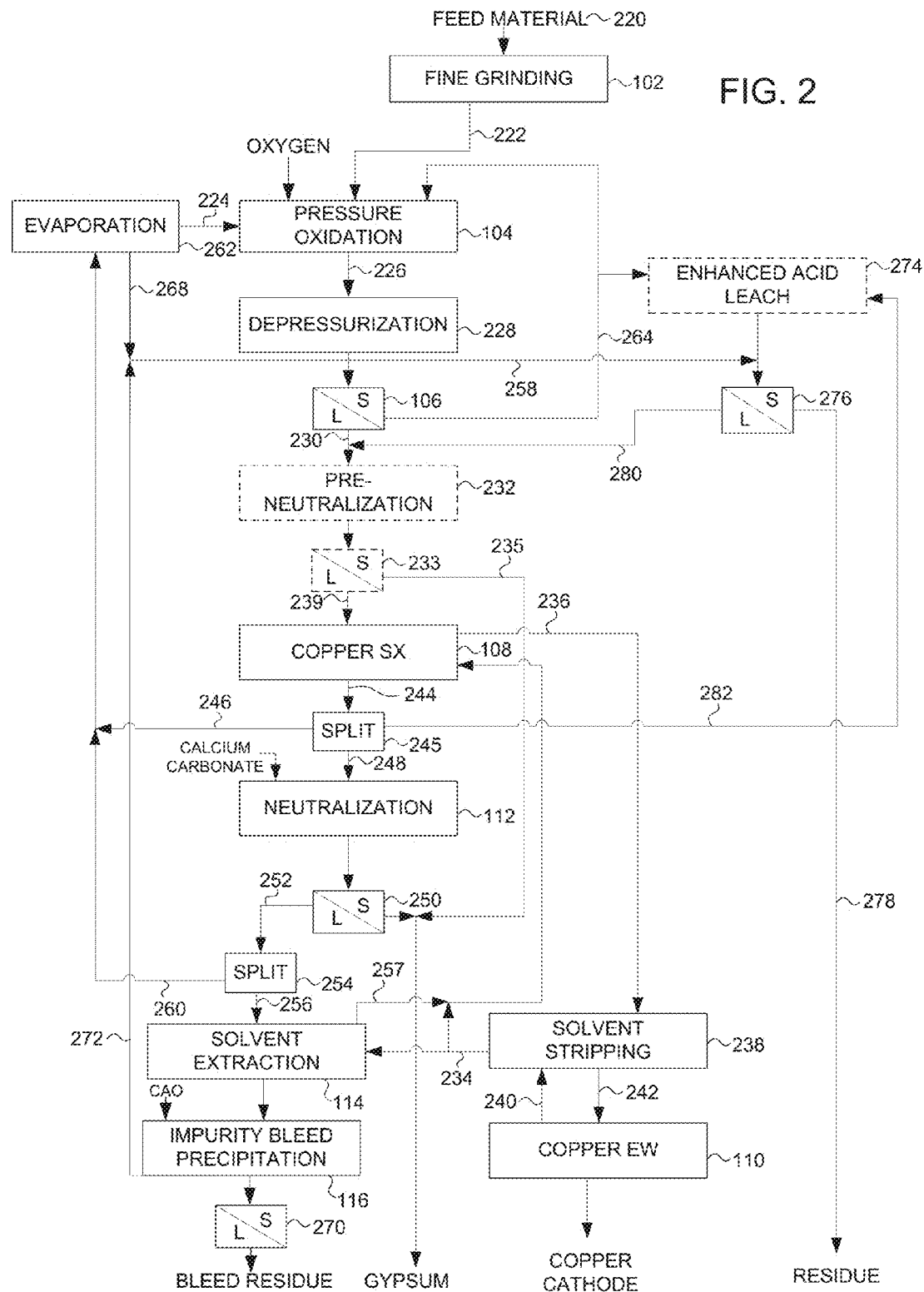
FIG. 2 illustrates the process flow for the recovery of copper according to an embodiment.

Referring to FIG. 2, a process flow for the recovery of copper is illustrated. The process may contain additional or fewer processes than shown and described, and parts of the process may be performed in a different order.

The feed material 220, which comprises concentrate and water, is generally at ambient temperature at the beginning of the process, i.e., from 5° C. to 30° C. depending on climate.

The feed material 220 is subjected to fine grinding at 102. The fine grinding at 102 is an ultra-fine grind to reduce the particle size such that about 80% of the particles are about 5 to about 15 microns in size and very few particles are greater than 20 microns in size. Preferably, ultra-fine grinding reduces the particle size such that about 80% of the particles are about 7 to about 10 microns in size. A fine grind is preferable but comes at a cost in energy consumption, which is about 60 to 80 kWh/t for such fine grinding, depending on the size of the starting concentrate.

The target grind size is a function of the concentrate mineralogy and the initial particle size of as-received feed material. Additional energy is utilized for finer grind sizes and incremental copper extraction is realized from the copper-arsenic minerals. Energy requirements go up exponentially with finer grind. In practice, there is no particular advantage in going below a P80 of about 7 to about 10 microns. The P80 value is indicative of the fraction of coarsest particles. It is preferable to keep the fraction of the coarsest particles low for leaching in the time allotted for pressure oxidation 104 in the autoclave.

The finely ground concentrate and water form a slurry 222 that is pumped into the pressure vessel for pressure oxidation. The slurry may be about 60% to about 65% solids. The slurry 222 is combined with aqueous feed solution 224 in the autoclave to provide a combined feed to the autoclave of, for example, 10% to 15% solids.

Next, pressure oxidation of the arsenic-bearing copper sulphide feed is carried out at 104. The pressure oxidation at 104 oxidizes the copper sulphide minerals, and, if present, other sulphide minerals of other base metals such as Ni, Co, and Zn. The oxidation takes place under moderate conditions that oxidize the metals present in the sulphide minerals, e.g., Cu, Fe, Ni, Co, and Zn, to $Cu^{++}$, $Fe^{+++}$, $Ni^{++}$, $Co^{++}$, $Zn^{++}$, respectively, while inhibiting oxidation of sulphur to sulphate.

The pressure oxidation 104 takes place under conditions of elevated temperature and pressure, utilizing oxygen, such as high-purity oxygen, in an agitated pressure vessel, such as an autoclave. The autoclave may be a horizontal design with the horizontal axis longer than the other two axes, which are usually equal, i.e., of round cross section. The autoclave may have several compartments, separated by weirs, so as to approach plug flow of slurry from feed end to discharge end. About 3 to 6 compartments are suitable. The first compartment may be larger than the remaining compartments to facilitate the heat balance in the autoclave, by allowing for a longer retention time in the first compartment, and thus more heat generated.

The reactions that take place during pressure oxidation 104 are exothermic, and the heat generated is calculated to produce a rise in temperature sufficient to raise the temperature to or near an optimum temperature that facilitates the desired reactions to occur at a rapid rate, i.e., achieve almost complete reaction of the concentrate within about one to two hours.

As the reactions proceed, oxygen is consumed and if not replenished the oxygen partial pressure declines rapidly, which is undesirable for pressure oxidation in the preferred short retention time. Therefore oxygen is fed into the autoclave continuously to maintain the pressure at the target pressure. The total pressure in the autoclave is the sum of oxygen and steam pressure, and pressure contributed by a small amount of other gases, such as non-condensables e.g., nitrogen and argon that may be introduced with the feed oxygen, as well as carbon dioxide arising from carbonates, organic carbon in the concentrate, and the gradual degradation of surfactant. The feed oxygen in practice may be only about 93% pure, the rest being the non-condensables.

The fraction of oxygen in the gas phase in the autoclave is kept at about 80% oxygen (dry basis). If the oxygen fraction is much less than 80%, the reactions that take place in the autoclave are slowed down. During continuous operation of the pressure oxidation 104, the oxygen fraction declines, as other gases that do not react are slowly added into the gas phase, resulting in their build-up unless measures are taken to maintain the oxygen fraction at about 80% or greater. Thus non-condensable gases such as nitrogen and argon, from the feed oxygen, and also carbon dioxide from reactions of carbonates in the copper concentrate accumulate in the gas phase unless measures are taken to limit this build up.

To keep up the oxygen fraction in the gas phase generally steady, the oxygen is fed into the autoclave and a small bleed of gas is removed on a continuous basis to reduce build-up of non-condensable gases such as nitrogen and argon and also carbon dioxide. Typically about 10-20% of the feed oxygen flow, in volume terms, is bled out and exhausted from the autoclave. This bleed of gas results in a loss of oxygen and is therefore kept low. A reasonable compromise is thus taken to keep up the fraction of oxygen at about 80% or more, and simultaneously bleed gases, which results in a loss of feed oxygen.

The initial slurry 222 together with an aqueous solution, referred to as a combined slurry, is subjected to the pressure oxidation 104 in the autoclave. The process may be carried out continuously, such that the aqueous solution and the initial slurry 222 are both pumped into the feed end of the autoclave continuously, and the product slurry is discharged continuously from the other end of the autoclave to maintain a generally constant volume of slurry reacting in the autoclave.

Suitable conditions in the autoclave during pressure oxidation 104 are:

a solids grind size with a P80 of about 5 µm to 15 µm;

from less than about 100 g/L solids to about 200 g/L solids in the combined slurry (grams of solids per litre of slurry after mixing the initial slurry 222 with the aqueous solution);

a surfactant dosage of about 1.5 to 10 kg/t;

a chloride dosage of about 3 to 20 g/L;

a temperature in the range of about 140° C. to 159° C.;

a total pressure of about 1000 kPa to about 1600 kPa (including steam and oxygen pressure, as well as pressure of other gases, such as nitrogen, argon, and carbon dioxide);

oxygen partial pressure of about 700 kPa to about 1400 kPa; and a retention time in the autoclave of about 60 to 120 minutes.

The resulting pressure oxidation discharge slurry may have about 10 to 40 g/L acid.

The pressure oxidation feed aqueous solution is generally recycled from other parts of the process, and includes about 5 to 20 g/l Cu, 4 to 25 g/l Cl, and free acid, and generally about 10 to 40 g/l $H_2SO_4$. At start up, sufficient hydrochloric acid is added to achieve the preferred chloride concentration. The aqueous feed solution also includes sulphate to maintain the other components in solution. Thus the aqueous or feed acid is a mixture of copper, sulphate, chloride, and hydrogen ions, in combination. Other elements may be present due to recycling of the solution and the inherent accumulation of minor impurities, such as Fe, Mg, Zn, etc.

Reference is made to the use of chloride in this specification. However, it will be appreciated that the chloride may be substituted with another halide such as bromide. Chloride (or bromide) in pressure oxidation 104 is utilized to promote enargite or tennantite or both enargite and tennantite leaching and to reduce unwanted sulphur oxidation. Chloride is utilized in the range of about 3 to 20 g/L Cl in the aqueous solution. Above the upper end of 20 g/L Cl, copper extraction appears to be reduced. Below the lower end of 3 g/L Cl, sulphur oxidation may be compromised and copper extraction may also be compromised. In the range of about 10 to 12 g/L Cl, conditions appear to result in Cu extraction and little sulphur oxidation results.

The arsenic-containing copper sulphide minerals undergo pressure oxidation in the autoclave. The reactions for enargite ($Cu_3AsS_4$) and tennantite ($Cu_{12}As_4S_{13}$) may be the following:

$$Cu_3AsS_4 + 2H_2SO_4 + 4.25O_2 \rightarrow 3CuSO_4 + H_3AsO_4 + 0.5H_2O + 3S° \quad (1)$$

$$Cu_{12}As_4S_{13} + 6H_2SO_4 + 19O_2 \rightarrow 12CuSO_4 + 4H_3AsO_4 + 7S° \quad (2)$$

Both copper and arsenic are solubilized as sulphate and arsenate, respectively. As shown in reactions (1) and (2), both enargite and tennantite convert less than 100% of the sulphur contained in the mineral to the elemental form of sulphur. Sulphur oxidation, as indicated by reactions (1) and (2), is inevitable and this is confirmed by laboratory test data. The above reactions suggest that the overall leaching reactions during pressure oxidation 104 are acid consuming. However, when the arsenic precipitates, acid is regenerated:

$$2H_3AsO_4 + Fe_2(SO_4)_3 + 4H_2O \rightarrow 2FeAsO_4 \cdot 2H_2O + 3H_2SO_4 \quad (3)$$

For reaction (3) to take place, iron is utilized and is present in copper concentrates either as pyrite ($FeS_2$) or as chalcopyrite ($CuFeS_2$). Experimental results indicate that oxygen is consumed to oxidize close to 50% sulphur. Thus, a further reaction takes place with the sulphur and oxygen:

$$S° + 1.5O_2 + H_2O \rightarrow H_2SO_4 \quad (4)$$

When low acid conditions exist in the autoclave, reaction (4) is favored. When higher acid levels exist in the autoclave, reaction (4) is partly suppressed.

In the case of the iron (Fe) minerals pyrite and pyrrhotite, the favored reactions are:

$$FeS_2 + 15/4O_2 + 2H_2O \rightarrow \frac{1}{2}Fe_2O_3 + 2H_2SO_4 \quad (5)$$

$$2FeS + 3/2O_2 \rightarrow Fe_2O_3 + 2S° \quad (6)$$

Arsenic Precipitation in the Autoclave

Arsenic is not simply dissolved in the autoclave. Instead, a portion of solubilized arsenic is precipitated during pressure oxidation 104 in the autoclave. Advantageously, the arsenic precipitates as scorodite which is widely recognized as the most environmentally stable form of arsenic-bearing residue.

$$Fe_2(SO_4)_3 + 2H_3AsO_4 + 4H_2O \rightarrow 3H_2SO_4 + 2FeAsO_4 \cdot 2H_2O \quad (7)$$

The arsenic to iron ratio (As:Fe) influences the amount of arsenic remaining in solution at the end of the pressure oxidation 104. At low As:Fe ratios (As:Fe<0.1), arsenic precipitation in the autoclave is close to complete. At high As:Fe ratios (As:Fe of 0.7 to about 1.3), the extent of arsenic precipitation in the autoclave is high. At As:Fe ratios above 1.3, insufficient Fe is present to form the scorodite phase and As is left in solution.

Figure 3:
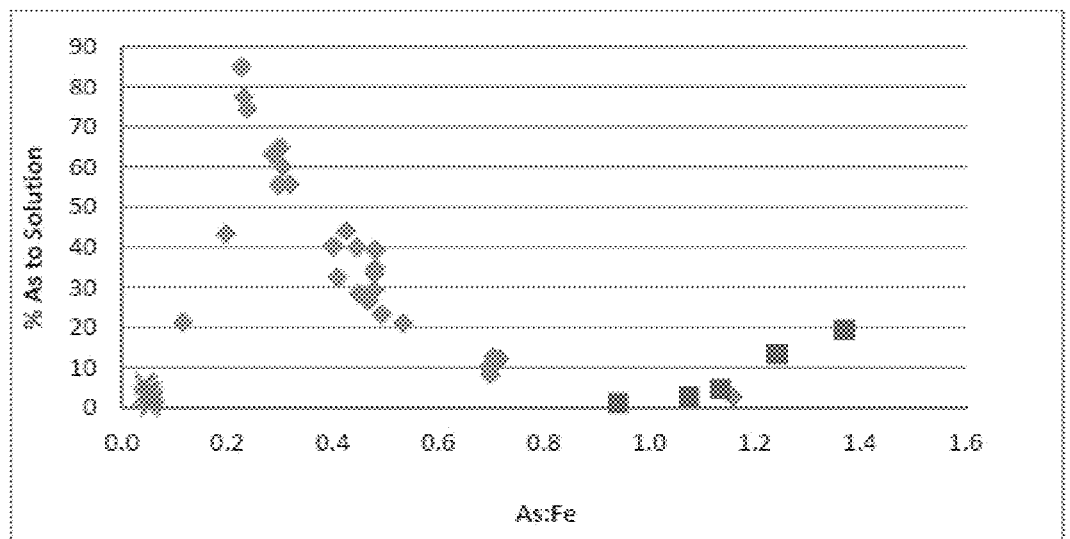
FIG. 3 shows a graph of the percentage of arsenic that deports to solution in the autoclave for different arsenic to iron ratios.

Iron must be present in the feed materials if arsenic is to be precipitated as scorodite. If little or no iron is present, copper arsenate may precipitate from solution unintentionally reducing the overall copper extraction. At least enough iron to make scorodite with the available arsenic is preferable. Surprisingly, a region of As:Fe ratios from about 0.1 to about 0.7 has been found in which, despite more than adequate Fe available to precipitate scorodite, only limited arsenic in solution precipitates out as scorodite. To address this anomalous behavior, arsenic-rich dusts may be added along with the initial slurry 222 to the autoclave to change the ratio of As:Fe, shifting the ratio to higher values and to a ratio in which the arsenic precipitates out as scorodite. Alternatively, other Fe-rich solids or solutions may be added to the autoclave to change the ratio of As:Fe, shifting the As:Fe ratio to a lower value and to a ratio in which the arsenic precipitates out as scorodite. The Fe-rich solids that are added are soluble in the autoclave conditions. FIG. 3 shows a graph of the percentage of arsenic that deports to solution in the autoclave for different arsenic to iron ratios. The ratio of arsenic to iron is the ratio in the combined feed to pressure oxidation 104 including the feed material, surfactant, and halogen, and not including recycled residue.

The graph of FIG. 3 includes data from several feed materials including concentrates and concentrate blends of about 1.2% to 16.1% Arsenic. The higher As:Fe ratios illustrated in the graph of FIG. 3 were achieved by adding As containing smelter flue dust. The pressure oxidation conditions were not identical in all tests. For example, free acid levels in the feed to autoclave were varied, and Fe in the feed acid was varied slightly. The varied parameters had little effect on the As in solution compared to the effect of the As:Fe ratio.

Feed acid is an important variable for some, but not all, arsenic-bearing copper concentrates. The benefit of higher acid in the autoclave feed is to suppress sulphur oxidation. When levels of arsenic or pyrite or arsenic and pyrite in the concentrates are high, the tendency to form sulphate as a side reaction is increased. The ideal acid level in the pressure oxidation feed is concentrate dependent, and can be a very wide range. The level of acid that is fed to the autoclave and that may be utilized to suppress unwanted sulphur oxidation ranges from about 7 g/L to 60 g/L. The preferred range is likely to be about 20 to 40 g/L. Too high an acid level reduces copper extraction in some cases and suppresses the extent of the scorodite precipitation.

Pyrite produces acid as shown in the reaction (5). The acid produced by pyrite plays a major role in determining the acid balance in pressure oxidation 104. If the acid produced by reaction (5) plus any acid added in the feed solution is greater than the acid consumed in reaction (1) and (2), an excess of acid results. In such a case, the copper in concentrates that is oxidized during pressure oxidation 104 is leached partly or wholly into solution.

All of the above oxidation reactions are exothermic and the percentage solids is adjusted, by adjusting the ratio of the two feed streams, i.e., the initial slurry 222 and the aqueous feed solution 224 in the process, to take advantage of the exothermic nature of the reactions. The combined slurry can thus reach an operating temperature in the autoclave of about 150° C., starting from generally ambient temperature feed streams, without recourse to external heat addition. Thus, the process may be carried out without additional heating or cooling costs. This is advantageous when dealing with slurry streams that may introduce scaling problems in heat exchangers.

In some instances, however, the percentage solids of the combined feed may be increased, for example, when secondary minerals such as chalcocite are present, and less thermal energy is realized compared to chalcopyrite, for instance.

Conversely, when pyrite is present in large amounts in the concentrate, correspondingly large amounts of heat are generated. In this case, the feed solution is kept as cool as possible, even utilizing cooling towers to remove heat, and also by reducing the percentage solids in the autoclave to inhibit the operating temperature of the pressure oxidation 104 from rising too high above the target temperature.

The pressure oxidation temperature influences copper extraction and sulphur oxidation as well as arsenic precipitation. The process may be operated within the range of 140° C. to 160° C. It is undesirable to operate the pressure oxidation 104 above 160° C. because liquid elemental sulphur, which is a product of the reaction in the autoclave, undergoes a phase transformation from a fluid state to a viscous state. This high viscosity is detrimental to the process and thus, a temperature in the range of 145° C. to 155° C. is preferred. A temperature of 150° C. may be chosen as a practical target although small excursions in the range of 150° C. to 160° C. are possible. Elemental sulphur is known to oxidize more readily to sulphuric acid above 160° C., which is also undesirable, creating excess heat and acid and unnecessarily using up oxygen and neutralizing reagent. Data from experiments at the higher temperatures indicated that the more desirable scorodite phase is present at 150° C. but less scorodite precipitates at higher temperatures.

The retention time for the pressure oxidation 104 is a function of how thoroughly the material is ground and the extent to which arsenic is precipitated in the pressure oxidation 104. A workable range of operation for the pressure oxidation retention time is from 60 to 120 minutes, as indicated above. A retention time of 90 minutes is preferred. Longer retention times marginally enhance copper extraction and favor greater arsenic precipitation, but at a cost of increased sulphur oxidation.

Sufficient oxygen pressure is utilized to support the reaction in the autoclave. A partial pressure of oxygen in the range of 700 to 1400 kPa may be utilized. A partial pressure of oxygen of 1000 kPa is preferred. Lower oxygen partial pressures may slow down the leaching reactions in the autoclave during pressure oxidation 104. On the other hand, excessive pressures place additional demands on the structural integrity of the autoclave and associated equipment.

Potassium iodide may, optionally, be added as a catalyst for the chalcopyrite and enargite reactions. The iodide catalyst increases the reaction rate which increases the overall copper extraction for a given retention time. The iodide addition increased copper extraction from 96.2% to 99.3% for KI additions between 0 and 16 kg/tonne of concentrate. Any addition above 1 kg/tonne may not be economically viable for the process.

The addition of surfactant to the feed slurry to the autoclave has been found to be beneficial in some circumstances to modify the nature of the sulphur as discharged from the autoclave, i.e., to render the sulphur particles more finely divided. The surfactant reduces the surface tension of the liquid sulphur phase at the operating temperature, leading to small droplets rather than large liquid globules in the autoclave, and correspondingly small solid particles in the product slurry after solidification.

The addition of surfactant facilitates copper extraction. Suitable surfactants include, for example, o-phenylenediamine or lignosol compounds such as calcium lignosulphonate. Other surfactants such as quebracho are known to perform a similar function in the related process of zinc pressure leaching and likely would be effective in the present copper pressure oxidation process. Aniline may also be utilized.

Surfactants were effective over a broad range of concentrations from 1.5 to 10 kg/t of concentrate. Too low a surfactant addition dosage may lead to sulphur pooling and agglomeration within the autoclave resulting in reduced copper extraction and potentially corrosive conditions due to inadequate access of oxygen to the mineral being leached (localized reducing conditions). Too much surfactant results in unnecessary expenditure for a costly reagent. A range of from 2 to 3 kg/t for a surfactant such as o-phenylenediamine (OPD) is preferred.

The product slurry 226 from pressure oxidation 104 is acidic and most or all of the copper minerals in the feed material 220 are leached into solution in the pressure oxidation 104. The sulphur oxidation during pressure oxidation 104 may be much higher than average, e.g. above 50%, depending on the amount of pyrite, which generally produces sulphate. The present process accommodates the excess acid produced.

The discharge of the hot pressurized product slurry 226 from the autoclave is accomplished very quickly such that there is a substantially instantaneous release of pressure. This form of slurry discharge is known as "flashing", in which the slurry is cooled almost instantly by the release of overpressure, i.e. releasing steam and any entrained oxygen. The release is controlled by a choke, which may include a letdown valve with variable opening, and takes place in a fraction of a second, e.g., milliseconds. The choke matches the discharge with the feed volume to the autoclave such that no change in volume results.

The product slurry 226 that is discharged from the pressure vessel by flashing 228 is subjected to liquid/solid separation 106. The liquid/solid separation 106 may be carried out in two stages by first thickening to about 40-50% solids, and then the underflow stream from the thickener may be filtered, either by known vacuum or pressure methods. Alternatively, counter current decantation may be utilized for the liquid/solid separation 106.

Washing may be carried out at the filtration stage to remove entrained leach liquor from the residue.

To facilitate filtering of the hot slurry, which is about 95° C. to 100° C. after flashing 228, part of the overflow stream from the thickener is cooled by, for example, a cooling tower, and the cooled stream is returned to the thickener to reduce the operating temperature of the thickener to about 65° C. or lower, which is a suitable temperature for filtering with most filters.

The remainder of the thickener overflow stream, referred to as leach liquor 230, is then sent to copper solvent extraction 108.

Depending on the sulphur oxidation and percentage solids fed to the autoclave for pressure oxidation 104, the acidic discharge may optionally be subjected to pre-neutralization 232 followed by liquid/solid separation 233 before solvent extraction 108. Gypsum resulting from the liquid/solid separation 233 may be filtered and washed as shown at 235. The neutralized stream 239 may be sent to copper solvent extraction 108.

The filtrate from the filter may be sent back to the thickener, and, optionally, a portion of the residue from the liquid/solid separation 276 may be treated for gold and silver recovery.

Part of the residue 264 that is produced from the liquid/solid separation at 106 may be recycled back to the autoclave for pressure oxidation 104. Residue recycling results in a significant improvement in copper sulphide conversion and arsenic deportment when a portion of the residue is mixed with the fresh concentrate and fed to the autoclave. The recycled residue provides seed material for the precipitation of scorodite and extends the retention time in the autoclave. No added value was realized above a ratio of recycled residue: fresh concentrate of 1:1.

Following pressure oxidation 104, flashing 228, and liquid/ solid separation 106, the copper leached into solution is recovered by solvent extraction 108, which includes stripping 238, and electrowinning 110. The aqueous stream typically has 30-50 g/L Cu.

Solvent extraction is known in the industry. Although the present process is referred to as solvent extraction, the present process includes two distinguishable processes, namely, extraction and stripping.

During copper solvent extraction 108, the leach liquor 230, or, optionally, neutralized stream 239, is contacted with an extractant, such as LIX 973, from BASF corporation, in a suitable ratio of organic to aqueous phases. A suitable ratio may be, for example, 3:1. The process takes place in a series of mixer-settlers or other similar equipment, with auxiliary equipment such as pumps, agitators, and storage tanks.

The solvent extraction 108 operates at about 40° C. and atmospheric pressure. The temperature is maintained by the sensible heat of the input streams including, for example, the hot pregnant leach solution (PLS) also referred to as leach liquor 230. If the temperature is too high, heat exchangers or cooling towers may be utilized to control the temperature to about 40° C. Conversely heat may be supplied by heat exchangers if needed for heating, in cold climates.

The organic extractant is diluted with a kerosene phase for performance, to produce a 35% to 40% by volume extractant.

The organic stream 234 fed to copper solvent extraction 108 originates in the stripping part of the process, described below, and is also referred to as "stripped organic" (SO). The stripped organic may have about 7 g/L-8 g/L Cu in solution, depending on composition, i.e., the percentage extractant in the diluent and other factors.

The mixture of aqueous and organic phases in the mixer-settler used in the extraction 108, is agitated for about 2 to 3 minutes, then passed into a quiescent zone of the mixer-settler, to allow separation of the phases by gravity, and the mixture is separated. This process may be repeated in another mixer-settler operated in counter current mode to the first, i.e., with the organic stream 234 flowing counter current to the aqueous stream, or leach liquor 230. This counter current process facilitates loading of the organic stream while still extracting most of the copper from the aqueous stream.

Alternative mixing and settling processes may be utilized, such as pulsed columns of various designs.

After extraction is completed in 1-2 stages, the loaded organic extractant (LO) usually contains 17-20 g/L Cu, if a 40 volume % extractant is used. The depleted aqueous stream, "raffinate", may contain about 10-15 g/L Cu and 40-65 g/L free acid, and is recycled for further leaching after possible neutralization.

The now Cu loaded organic 236 is then stripped of Cu content at 238 by contacting with a strong acid stream 240, also referred to as "stripped electrolyte" (SE), which is recycled from the electrowinning (EW) 110. The strong acid stream 240 converts the loaded organic (LO) to stripped organic (SO) 234 containing about 7-8 g/L Cu. A portion of the stripped organic (SO) 234 is then recycled to solvent extraction 108, completing the circuit and a portion of the stripped organic (SO) 234 is utilized in the secondary solvent extraction 114, referred to below.

The stripped electrolyte (SE) 240 is enriched in copper by this stripping process, and is thus converted to pregnant electrolyte 242, or PE, which is sent to copper electrowinning 110 for copper recovery.

The pregnant electrolyte (PE) 242 produced by the stripping process generally contains about 45-50 g/L Cu and 150-160 g/L free acid as $H_2SO_4$. pregnant electrolyte (PE) 242 is subjected to electrowinning 110 to reduce the concentration of copper by about 10-12 g/L Cu and produce copper metal in the form of high purity cathodes. Electrowinning 110 may be carried out continuously, with the cathodes being stripped every 5-8 days.

During electrowinning 110, the pregnant electrolyte 242 is converted back to stripped electrolyte 240 with a depleted Cu content but a correspondingly higher acidity. The composition of the stripped electrolyte 240 is approximately 35-40 g/L Cu and about 170-180 g/L free acid, which is then utilized for more stripping in the solvent extraction circuit. This completes the cycle for the stripped electrolyte-pregnant electrolyte.

The raffinate 244 produced by the solvent extraction 108 is acidic. The raffinate 244 is split, as indicated by the numeral 245, and part of the raffinate, indicated by the numeral 246 is subjected to evaporation. After evaporation, the remaining aqueous feed solution 224 may be sent to pressure oxidation 104 and the condensate 268 may be utilized in the liquid/solid separation 276.

Thus, part of the raffinate 246 is utilized in pressure oxidation 104. The raffinate is split depending on the pressure oxidation 104, and the remainder of the raffinate, indicated by the numeral 248 is neutralized.

During pressure oxidation some sulphur in the concentrate is oxidized to sulphate, which is removed to reduce accumulation. Most of this sulphur oxidation is due to the pyrite reaction (5) above.

The sulphate is removed by partly neutralizing the raffinate stream 248 after solvent extraction 108, as shown in FIG. 2. As indicated above, only a fraction of the raffinate stream 244 from the solvent extraction 108 is neutralized at 112 as some of the acid is utilized for pressure oxidation 104, as shown in reactions (1) and (2), for example.

Neutralization is effected on the selected fraction of raffinate 248 utilizing limestone, $CaCO_3$, to react with free acid. This process is carried out in a series of agitated tanks connected in series with gravity overflow, and forms gypsum, $CaSO_4.2H_2O$ as a solid byproduct. The gypsum is filtered and washed as shown at 250. The gypsum filter cakes from the filtration 250 are sent to tailings for disposal. The filtrate or neutralized stream 252 from filtration 250 is split 254 and a portion 256 is sent to a secondary solvent extraction 114. A portion of the stripped organic (SO) 234 from solvent stripping 238 is utilized in the secondary solvent extraction 114.

The organic phase 257 that is utilized in the secondary solvent extraction 114 is returned to the primary solvent extraction at 108 where the copper is recovered and sent on to the copper electrowinning step. The pH of the copper-depleted aqueous stream is increased, for example, using lime, to facilitate precipitation of the impurities at 116. This precipitation at 116, and subsequent liquid/solid separation 270, produces a bleed residue. The product solution 272 is recycled and is utilized for washing the iron residue in the upstream liquid/solid separation at 276. Thus, the neutralized readily soluble impurities, such as zinc for example, are bled from the process to inhibit the concentration of such impurities from climbing to unacceptable levels.

The remaining portion 260 of the neutralized stream 252, which is the portion that is not subjected to the secondary solvent extraction 114, is subjected to evaporation 262 with the part of the acidic raffinate 246 produced by the solvent extraction 108. After evaporation, part 224 of the remaining aqueous feed solution may be sent to pressure oxidation 104 and condensate 268 from the evaporation 262 may be utilized in washing of the residue in the liquid/solid separation 276.

As indicated above, part of the residue 264 that is produced from the liquid/solid separation at 106 may be recycled back to the autoclave for pressure oxidation 104. The remainder of the iron-rich residue 264 that is produced from the liquid/solid separation at 106 may be discarded. Optionally, the remainder of the iron-rich residue 264 may be subsequently processed for recovery of precious metal values. The portion of the iron-rich residue 264 that is not recycled back to pressure oxidation 104 may be leached in a hot dilute acid solution containing chloride, to keep a low cyanide-soluble copper content. This process is referred to as "enhanced acid leaching", and is indicated by reference numeral 274. The conditions of the enhanced acid leach 274 are utilized for subsequent precious metal leaching with cyanide solutions, in which copper is a major consumer of cyanide.

The main reaction in the enhanced acid leach 274 is the dissolution of basic copper sulphate by sulphuric acid:

$$[CuSO_4.2Cu(OH)_2]+2H_2SO_4 \rightarrow 3CuSO_4+4H_2O \quad (8)$$

The sulphuric acid is supplied by raffinate from solvent extraction referred to below.

The conditions during enhanced acid leach 274 are similar to the atmospheric leach step described in the U.S. Pat. No. 5,645,708, ('708 patent) the entire content of which is incorporated herein by reference, but are more severe.

For example, suitable conditions include:
a temperature in the range of 50° C.-95° C., preferably 75° C.;
a retention time of 2 to 4 hours, preferably 3 hours;
chloride concentration in the leach solution of 2 to 10 g/L, preferably 4 g/L; and
a pH of 1.0-1.5, preferably 1.3.

Not all of these enhancements need to be implemented at the same time, but the benefits of enhanced acid leaching for subsequent precious metal leaching appear to flow from a combination of these conditions.

Reaction (8) does not quite go to completion in the "normal" atmospheric leaching described in the '708 patent. Typically 2-5% of the Cu content is left in the residue, which is apparently mostly due to adsorption onto, or co-precipitation with, Fe and, to a lesser extent, due to incompletely oxidized Cu sulphide mineral. Unfortunately some of this "unleached" Cu left over after atmospheric leaching (AL) is cyanide soluble, i.e. forms soluble copper cyanides in the subsequent stages of the process. However, the cyanide soluble Cu is substantially reduced by the enhanced acid leach 274 (EAL).

The enhanced acid leach 274 may be carried out in a reactor train of 3-4 stirred tanks, with gravity overflow connecting the tanks in series. The tanks are agitated moderately, to provide adequate mixing of liquid and solids. Coagulant may be added into the last (4th) reactor to help coagulate fine solids, which aids in the flocculation used in the subsequent thickening operation.

Filtration of the leach solids resulting from the enhanced acid leach 274 is hindered by the presence of fine solids. Fortunately, the fine solids thicken quite well, provided adequate coagulation and flocculation is used, producing underflow streams of 45-55% solids in reasonable settling times.

The resultant slurry from the enhanced acid leach 274 is therefore pumped to a series of 3-6 thickeners for counter current decantation, (CCD circuit) with wash water added into the last thickener and slurry fed to the first thickener. CCD circuits are a well-established technology in which thickener overflow from each thickener moves in an opposite direction to the thickener underflow, efficiently utilizing wash water.

Wash water (stream 258) utilized in the CCD circuit may be partly derived from the solution 272 obtained after impurity bleed precipitation 116 and from the condensate 268 from evaporation 262.

Additional wash water may be added in the form of fresh water depending on the water balance of the whole CCD-EAL circuit. The fresh water helps to remove minor amounts of entrained copper bearing liquor in the CCD circuit.

Advantageously, most wash water is generated internally, allowing the process to run with water that is added, as opposed to a surplus liquid effluent that is disposed of, which may create environmental issues. In principle, the overall process operates without liquid effluent and is therefore considered a "closed" loop.

The leached residue from the enhanced acid leach 274 is thus separated from the leach solution by a liquid/solid separation 276. The liquid/solid separation may comprise thickening in a series of thickeners operated counter currently or filtration, to produce a residue 278 that is ready for the extraction of precious metals.

The liquor product of the CCD circuit, which is the overflow from the first thickener, is pregnant leach liquor 280 that may, optionally, be subjected to pre-neutralization 232 and liquid/solid separation 233. The pregnant leach liquor is treated for copper recovery by solvent extraction at 108.

The raffinate 244 may be split, as shown at 245, into a third stream 282. The third stream 282 may be utilized in the enhanced acid leach 274 and provides sulphuric acid for the enhanced acid leaching process.

The following examples are submitted to further illustrate various embodiments of the present invention. These examples are intended to be illustrative only and are not intended to limit the scope of the present invention. A summary of examples is provided in table 1.

TABLE 1

List of Examples

| Example # | Purpose | Conclusion |
|---|---|---|
| 1 | Finer Grinding | Finer grind increased Cu extraction from enargite |
| 2 | Finer Grinding without Chlorides | Surfactant by itself was not helpful in promoting the oxidation of enargite. |
| 3 | Finer Grind in the Presence of Chlorides | Surfactant and chloride acted synergistically when processing finely ground enargite bearing Cu concentrate. |
| 4 | Various Chloride Levels | |
| 5 | Finer Grind with Other Concentrates | Fine grinding and chloride increased Cu extraction and lowered S oxidation. |
| 6 | Surfactant Type and Dosage | OPD was the best surfactant tested. Higher dosage was not necessarily better. Determined case by case. |
| 7 | Surfactant Type and Dosage | OPD was the best surfactant tested. |
| 8 | Pressure Oxidation Retention Time | Higher retention times promoted copper sulphide conversion and As precipitation |

TABLE 1-continued

List of Examples

| Example # | Purpose | Conclusion |
|---|---|---|
| 9 | Residue Recycle | Residue recycle promoted copper sulphide conversion and As precipitation |
| 10 | KI Addition | KI addition increased copper sulphide conversion |
| 11 | Free Acid in Feed | Increasing the free acid in the feed suppresses sulphur oxidation |
| 12 | Temperature and Pressure | |

The following examples illustrate that the presence of chloride, in conjunction with ultra-fine grinding, and surfactant are utilized to achieve good copper recovery.

In each of the examples described herein, a 1.1 L batch autoclave was utilized. Conditions in the autoclave are indicated for each example and, unless otherwise indicated, included an oxygen partial pressure of 145 psi (1000 kPa).

EXAMPLE 1

The following example demonstrates the benefit of fine grinding when leaching enargite bearing material in the presence of chloride and a surfactant during pressure oxidation. A feed material assay of 34% Cu, 12% Fe, 36% S and 12% As (~64% enargite, 1% tennantite, 8% chalcopyrite, 21% pyrite) was leached by pressure oxidation under the following conditions:
   total pressure of 200 psig (1378 kPag);
   temperature of 150° C.;
   retention time of 60 minutes;
   utilizing a feed solution including 12 g/L Cl, 8 g/L free acid, and 15 g/L Cu; and
   surfactant addition of o-phenylenediamine (OPD) of 5 kg/t.

The extent of grinding was varied as shown in Table 2.

TABLE 2

GRIND SIZE EFFECT ON Cu EXTRACTION

| Grind Size, P80 - µm | Cu Extraction, % |
|---|---|
| 23 | 64.2 |
| 17 | 82.6 |
| 15 | 80.2 |
| 11 | 85.7 |
| 9 | 89.7 |
| 7 | 92.9 |

Additional grinding prior to pressure oxidation improved leaching of the enargite mineral and overall copper extraction. Neither surfactant addition nor retention time was optimal.

Figure 4:
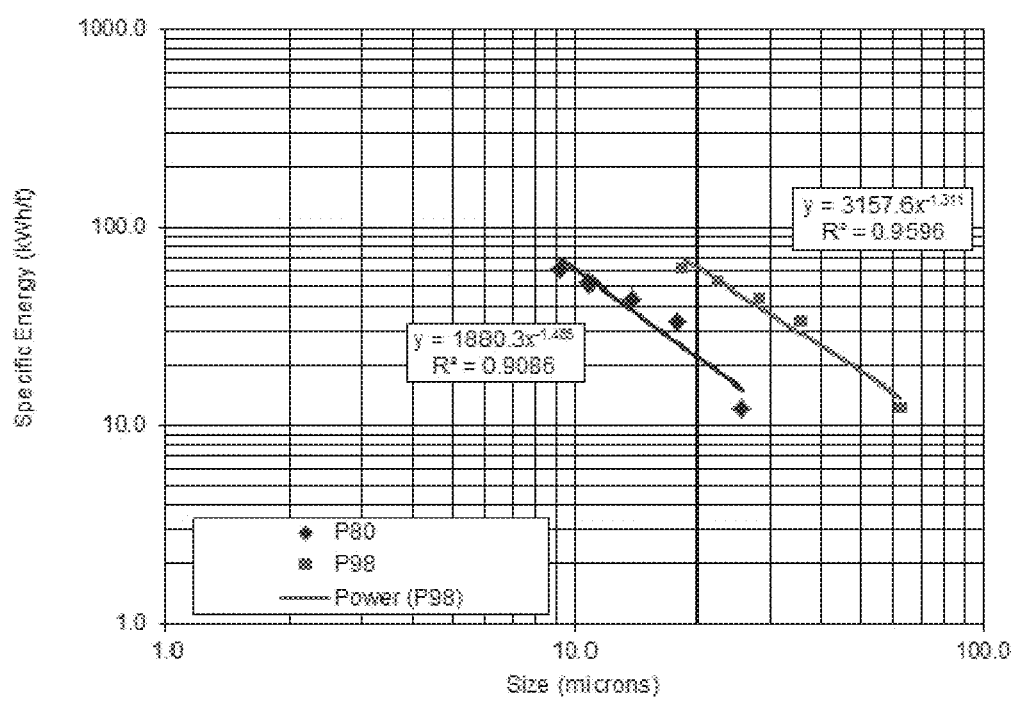
FIG. 4 is a graph of the energy utilized in fine grinding of concentrate feed material.

The additional energy required for ultra-fine grinding and incremental copper extraction from the copper-arsenic minerals is not always economical. FIG. 4 is a graph of specific energy utilized for fine grinding. Grind sizes lower than 5 um are seldom economical.

Conclusion

Copper extraction increases with finer grind size in the presence of chloride and surfactant.

EXAMPLE 2

The following example demonstrates that the use of surfactant in the absence of chloride when leaching enargite bearing material during pressure oxidation does not result in sufficient copper recovery.

The same feed material was utilized as in Example 1 and was leached in the absence of chlorides. The feed material assay of 34% Cu, 12% Fe, 36% S and 12% As (~64% enargite, 1% tennantite, 8% chalcopyrite, 21% pyrite) was leached by pressure oxidation under the following conditions:
   total pressure of 200 psig (1378 kPag);
   temperature of 150° C.;
   retention time of 90 minutes;
   utilizing a feed solution including 40 g/L free acid and 12 g/L Cu; and
   surfactant addition of o-phenylenediamine (OPD) of 5 kg/t.

The use of surfactant was varied for a fine grind size in the absence of chloride as shown in Table 3.

TABLE 3

EFFECT OF FINE GRINDING AND SURFACTANT IN ABSENCE OF CHLORIDE

| Grind Size, P80 - µm | Surfactant | Chloride | Cu Extraction, % |
|---|---|---|---|
| 7 | no | No | 90.0 |
| 7 | yes (5 kg/t) | No | 86.9 |
| 7 | yes (5 kg/t) | No | 88.7 |

Conclusion

Surfactant, by itself and in the absence of chloride, does not promote sufficient oxidation of the enargite even with fine grind size.

EXAMPLE 3

The following example demonstrates that the presence of chloride and surfactant when leaching enargite bearing material during pressure oxidation improved leaching and overall copper recovery.

Additional tests were conducted in the presence of chloride at 12 g/L in the feed solution. The remaining conditions were the same as specified in Example 2. The feed material assay of 34% Cu, 12% Fe, 36% S and 12% As (~64% enargite, 1% tennantite, 8% chalcopyrite, 21% pyrite) was leached by pressure oxidation under the following conditions:
   total pressure of 200 psig (1378 kPag);
   temperature of 150° C.;
   retention time of 90 minutes;
   utilizing a feed solution including 12 g/L Cl, 40 g/L free acid, and 12 g/L Cu; and
   surfactant addition of o-phenylenediamine (OPD) of 5 kg/t.

Presence of surfactant was varied as shown in table 4.

TABLE 4

SURFACTANT EFFECT IN THE PRESENCE OF CHLORIDE ON Cu EXTRACTION FROM FINELY GROUND FEED MATERIAL

| Grind Size, P80 - µm | Surfactant | Chloride, g/L | Cu Extraction, % |
|---|---|---|---|
| 7 | no | 12 | 93.8 |
| 7 | yes (5 kg/t) | 12 | 96.8 |

From the comparison of results from Example 2 and from Example 3, the presence of chloride was clearly beneficial in oxidizing the copper sulphide mineral when leaching enargite bearing material during pressure oxidation. In the presence of chloride, surfactant promoted further benefit in copper extraction. Examples 2 and 3 illustrate that surfactant and chloride act synergistically rather than in additive fashion when processing finely-ground arsenic-bearing copper concentrate.

Conclusion

Fine grinding, surfactant and chloride act synergistically to promote oxidation of the enargite and recovery of copper from feed material with fine grind size.

EXAMPLE 4

The following example demonstrates the effect of chloride level when leaching enargite bearing material during pressure oxidation.

Two different samples of low pyrite concentrate with a concentrate assay of 31-33.1% Cu, 11-11.5% Fe, 35.5-37.9% S and 10.3-11.8% As were leached by pressure oxidation under the following conditions:
- total pressure of 200 psig (1378 kPag);
- temperature of 150° C.;
- retention time of 90 minutes;
- utilizing a feed solution including 40 g/L free acid, and 12 g/L Cu;
- surfactant addition of o-phenylenediamine (OPD) of 3 kg/t; and
- a grind size of P80=7 um and P80=22 um.

The conditions of the test at 0 g/l Cl differ slightly from the others in that the copper in the feed solution was 15 g/l Cu and the surfactant addition was 5 kg/t OPD. The remaining conditions of the test at 0 g/l Cl were as listed above.

Figure 5:
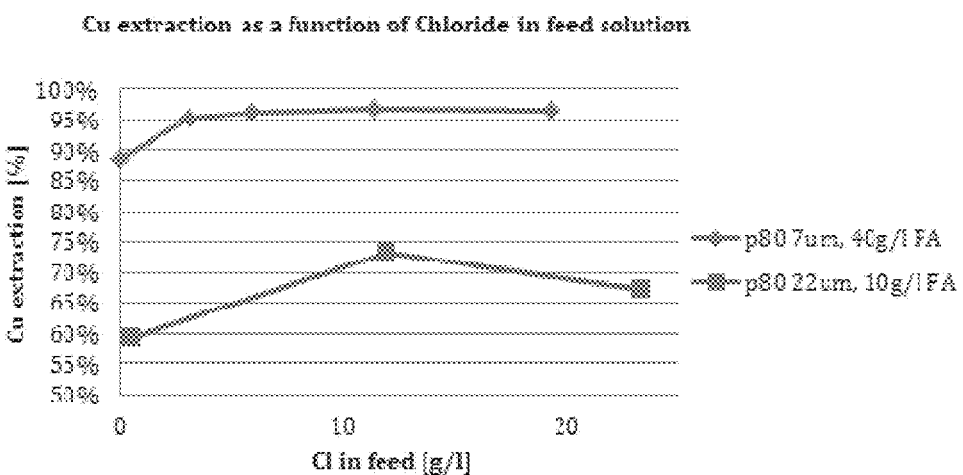
FIG. 5 is a graph showing copper recovery for different chloride levels in feed solution.

FIG. 5 is a graph illustrating copper recovery for different chloride levels in feed solution. Chloride in the range of about 3 to 20 g/L Cl in the aqueous solution promotes copper extraction. Above about 20 g/L Cl, copper extraction appears to be reduced. Below about 3 g/L Cl, sulphur oxidation and copper extraction are insufficient. In the range of about 10 to 12 g/L, conditions appear to result in good Cu extraction and little sulphur oxidation. FIG. 5 also illustrates the recovery of copper for different grind sizes. A grind size of P80=7 um results in a significant improvement in copper extraction compared to a grind size of P80=22 um.

Conclusion

Chloride in the range of about 3 to 20 g/L Cl in the aqueous solution, in the presence of surfactant, promotes copper extraction. Fine grinding of concentrate, prior to pressure oxidation in the presence of chloride and surfactant, promotes copper extraction.

EXAMPLE 5

The following example demonstrates the effect of fine grinding on different enargite bearing feed material.

The feed materials were leached by pressure oxidation under the following conditions:
- total pressure of 200 psig (1378 kPag);
- temperature of 150° C.;
- retention time of 60 minutes;
- utilizing a feed solution including 20 g/L free acid, and 15 g/L Cu;
- surfactant addition of o-phenylenediamine (OPD) of 5 kg/t; and
- a grind size of P80=7 um.

The feed solutions also contained 12 g/L Cl, with the exception of one in which chloride was not present in the feed solution, as indicated in Table 5.

Results are presented in Table 5, but are only relative. The fraction of enargite in the concentrates varied and the extent of grinding was not as great as in the previous examples.

TABLE 5

EFFECT OF FINE GRINDING OF VARIOUS CONCENTRATES ON Cu RECOVERY

| Feed | Fine Grind | Cl, g/L | Cu Sulphide Oxidized, % | S Oxidized, % |
|---|---|---|---|---|
| Conc A | no | 12 | 69 | 48 |
|  | yes | 0 | 91 | 91 |
|  | yes | 12 | 95 | 51 |
| Conc B | no | 12 | 88 | 49 |
|  | yes | 12 | 95 | 56 |

Concentrate "A" had an assay of 15% Cu, 31% S, 24% Fe, and 5.5% As. In the absence of fine grinding of the feed concentrate "A", conversion of the sulphide from the enargite containing material was 69%. Fine grinding the feed concentrate "A" in the absence of chloride in the feed solution enhanced Cu sulphide conversion to 91%, but at the cost of additional unwanted sulphur oxidation. Fine grinding the feed concentrate "A" with chloride present in the feed solution increased copper sulphide conversion to 95% and returned sulphur oxidation to 51%.

Concentrate "B" had an assay of 27% Cu, 40% S, 23% Fe, and 9% As (~48% enargite in concentrate). Fine grinding the feed concentrate "B" increased copper sulphide conversion from 88 to 95%.

These examples show that regrinding is beneficial to arsenic-bearing concentrates when utilizing the pressure oxidation conditions described above. These benefits cannot be achieved with the use of chloride or surfactant alone.

Conclusion

Fine grinding of other enargite bearing feed materials increases copper recovery while the presence of chloride suppresses sulphur oxidation and improves copper extraction during pressure oxidation in the presence of a surfactant.

EXAMPLE 6

Figure 6:
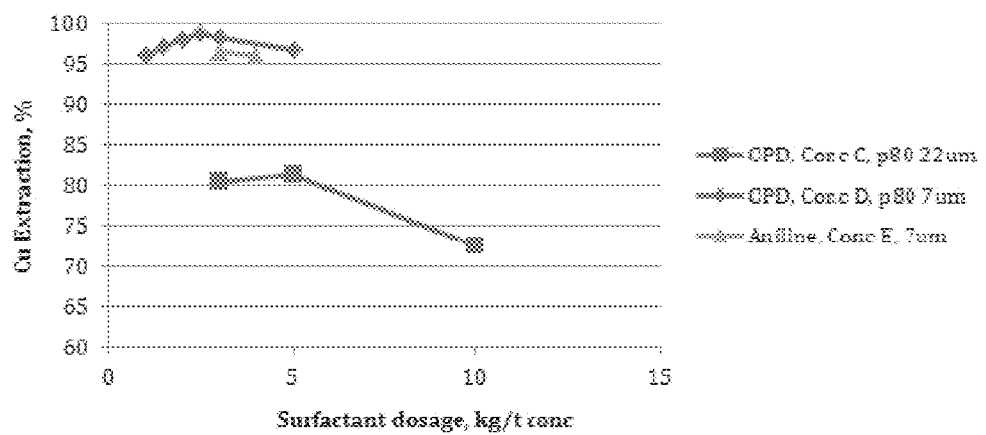
FIG. 6 is a graph showing the effect of surfactant dosage on copper extraction.

The following example demonstrates the effect of different surfactant types and dosages on copper extraction. FIG. 6 is a graph showing the effect of surfactant dosage on copper extraction. Concentrate compositions and test conditions for the copper extractions illustrated in the graph of FIG. 6 are shown in Table 6.

TABLE 6

CONCENTRATE COMPOSITIONS AND TEST CONDITIONS

|  |  | Concentrates | | |
|---|---|---|---|---|
|  |  | C | D | E |
| Concentrate assay |  |  |  |  |
| Cu | % | 33.5 | 28.2 | 29.2 |
| Fe | % | 11.8 | 19.7 | 19.1 |
| S | % | 36.4 | 40 | 41.9 |
| As | % | 11.8 | 11.6 | 9 |
| Ptot | psig | 200 | 200 | 200 |
| T | (C.) | 150 | 150 | 150 |
| RT | min | 60 | 90 | 90 |

TABLE 6-continued

CONCENTRATE COMPOSITIONS AND TEST CONDITIONS

|  |  | Concentrates | | |
| --- | --- | --- | --- | --- |
|  |  | C | D | E |
| Feed acid solution | | | | |
| Cl | g/l | 12 | 12 | 12 |
| FA | g/l | 10 | 20 | 20 |
| Cu | g/l | 12 | 12 | 12 |
| p80 | um | 22 | 7 | 7 |

The grind size of concentrate C feed material was coarser than in previous examples. Increasing surfactant dosage in the feed solution to the pressure oxidation did not necessarily increase the copper recovery as the highest surfactant dosage in the feed solution to the pressure oxidation did not achieve higher copper extraction. The optimum surfactant dosage of a particular surfactant differs for different concentrates.

For similar copper concentrates (D and E) and identical conditions, o-phenylenediamine (OPD) appears to deliver better copper extraction than Aniline.

Conclusion

The optimal surfactant dosage varies from concentrate to concentrate and the amount utilized is influenced by economic factors.

EXAMPLE 7

The following example demonstrates the effect of different surfactant types on copper extraction.

Figure 7:
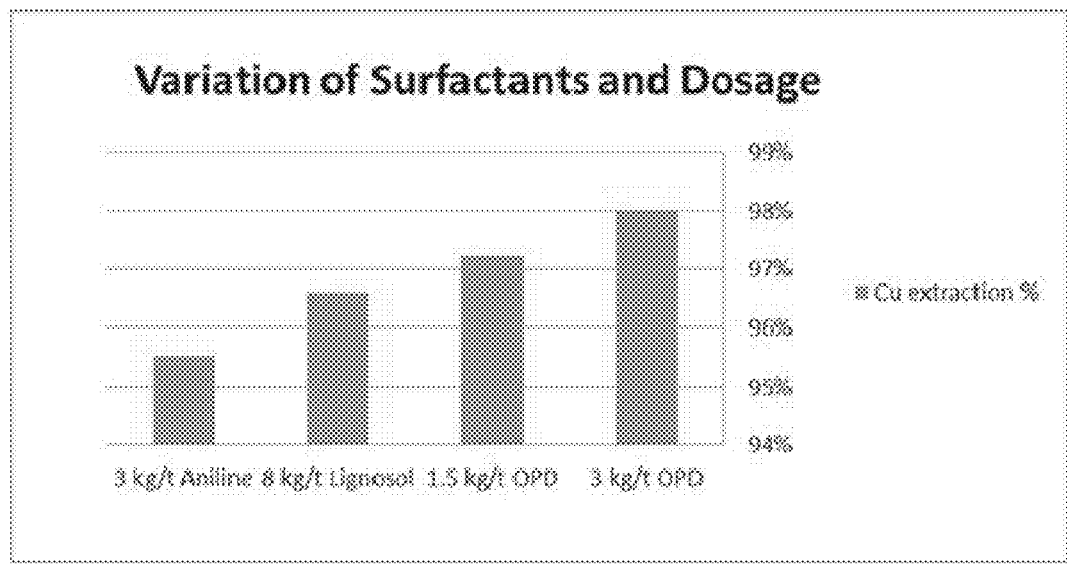
FIG. 7 is a graph showing the effect of different surfactants and dosages on copper extraction.

A concentrate assay of 28.5% Cu, 18% Fe, 43% S, and 8.3% As was leached by pressure oxidation under the following conditions:
- total pressure of 200 psig (1378 kPag);
- temperature of 150° C.;
- utilizing a feed solution including 12 g/L Cl, 20 g/L free acid, and 12 g/L Cu;
- The effect of different surfactants and dosages on copper extraction is illustrated in the graph of FIG. 7.

For the concentrate assay of this example, o-phenylenediamine (OPD) appears to deliver better copper extraction than Aniline and Lignosol.

Conclusion

OPD appears to deliver better copper extraction than Aniline and Lignosol.

EXAMPLE 8

The following example demonstrates the effect of retention time of pressure oxidation on copper extraction.

A concentrate assay of 34% Cu, 12% Fe, 36% S and 12% As (~64% enargite, 1% tennantite, 8% chalcopyrite, 21% pyrite) was leached by pressure oxidation under the following conditions:
- total pressure of 200 psig (1378 kPag);
- temperature of 150° C.;
- utilizing a feed solution including 12 g/L Cl, 10 g/L free acid, and 14 g/L Cu;
- surfactant addition of o-phenylenediamine (OPD) of 3 kg/t; and
- a grind size of P80=22 um.

The grind size in this example was high.

The retention time of pressure oxidation in the autoclave was varied as shown in Table 7.

TABLE 7

EFFECT OF RETENTION TIME OF COPPER EXTRACTION AND ARSENIC PRECIPITATION

| Retention time min | Cu Extraction % | As Deportment to Residue % | S Oxidation % |
| --- | --- | --- | --- |
| 60 | 81.1 | 87 | 41 |
| 90 | 88.4 | 96 | 52 |
| 120 | 91.0 | 99 | 58 |
| 180 | 94.8 | 99 | 63 |

Longer retention times result in increased copper recovery and arsenic precipitation in the autoclave, but also result in increased sulphur oxidation. A retention time in the range of about 60 to 120 minutes may be utilized. A retention time of 90 minutes is preferable.

Conclusion

Retention time of greater than 90 marginally enhances copper extraction and favors greater arsenic precipitation, but at a cost of increased sulphur oxidation.

EXAMPLE 9

The following example demonstrates the effect of residue recycling on copper recovery and arsenic precipitation.

A concentrate assay of 29% Cu, 17% Fe, 41% S and 9% As was leached by pressure oxidation under the following conditions:
- total pressure of 200 psig (1378 kPag);
- temperature of 150° C.;
- retention time of 90 minutes;
- utilizing a feed solution including 12 g/L Cl, 40 g/L free acid, and 12 g/L Cu;
- a grind size of P80=10 um; and
- Aniline surfactant of 3 kg/t.

The recycle ratio, which is the ratio of recycled residue:fresh concentrate that is sent to the autoclave was varied as shown in Table 8.

TABLE 8

EFFECT OF RESIDUE RECYCLING ON COPPER EXTRACTION AND ARSENIC PRECIPITATION

| Recycling Ratio | Cu tot in Residue % | Cu Extraction % | As in Filtrate g/L |
| --- | --- | --- | --- |
| 1.5 | 1.2 | 98.6 | 473 |
| 1.0 | 1.3 | 98.4 | 426 |
| 0.5 | 1.4 | 98.3 | 570 |
| 0 | 2.0 | 97.5 | 1510 |

Recycling a portion of the residue from the autoclave discharge back to the autoclave in a ratio of solid recycled residue:fresh concentrate of about 0.1:1 to 1.5:1 results in improved copper extraction and arsenic precipitation. Recycle ratios higher than 1:1 do not appear to significantly improve copper extraction nor promote additional arsenic precipitation.

Conclusion

Recycling residue back to the autoclave improves copper extraction up to a recycled residue:fresh concentrate ratio of about 1 and promotes greater arsenic precipitation in the autoclave.

EXAMPLE 10

The following example demonstrates the effect of KI reagent on copper extraction. A concentrate assay of 24% Cu, 19% Fe, 39% S and 8% As (~37% enargite, 45% pyrite, 4% chalcopyrite) was leached by pressure oxidation under the following conditions:
- total pressure of 200 psig (1378 kPag);
- temperature of 150° C.;
- retention time of 90 minutes;
- utilizing a feed solution including 12 g/L Cl, 40 g/L free acid, and 12 g/L Cu;
- a grind size of P80=7 um; and
- Aniline surfactant of 3 kg/t.

The dosage of KI reagent utilized in pressure oxidation was varied as shown in Table 9.

TABLE 9

EFFECT OF KI DOSAGE ON Cu EXTRACTION

| KI Dosage kg/t conc | Cu Extraction % |
|---|---|
| 0 | 96.2 |
| 0.25 | 97.8 |
| 0.5 | 97.6 |
| 1 | 98.4 |
| 6.5 | 99.3 |
| 13 | 98.4 |

The addition of KI is beneficial. Additions higher than 1 kg/t concentrate are difficult to justify economically.

Conclusion

The addition of KI is beneficial.

EXAMPLE 11

The following example demonstrates the effect of the amount of free acid in the feed to the autoclave on copper extraction and on sulphur oxidation.

A concentrate assay of 34% Cu, 12% Fe, 36% S and 12% As (~64% enargite, 1% tennantite, 8% chalcopyrite, 21% pyrite) was leached by pressure oxidation under the following conditions:
- total pressure of 200 psig (1378 kPag);
- temperature of 150° C.;
- utilizing a feed solution including 12 g/L Cl, and 14 g/L Cu;
- a grind size of P80=7 um; and
- surfactant addition of o-phenylenediamine (OPD) of 5 kg/t.

The free acid level in the feed to the autoclave was varied as shown in Table 10.

TABLE 10

EFFECT OF FREE ACID LEVEL IN FEED TO AUTOCLAVE ON COPPER EXTRACTON AND SULPHUR OXIDATION

| Retention time (minutes) | Free Acid in Feed g/l | Free Acid in Discharge g/l | Cu Extraction % | Sulphur Oxidation (SO$_4$ method) % |
|---|---|---|---|---|
| 60 | 7.8 | 18.5 | 92.9 | 61 |
| 60 | 39.4 | 36.2 | 93.0 | 44 |
| 90 | 39.0 | 36.6 | 96.7 | 51 |
| 90 | 60.0 | 50.8 | 96.5 | 44 |

The two sets of data in TABLE 10, at retention times of 60 minutes and 90 minutes, show that increasing the free acid level in the autoclave feed results in suppression of sulphur oxidation. The sulphur oxidation utilizing about 39 g/L free acid in the autoclave feed is higher for the longer retention time of 90 minutes compared to 60 minutes.

Conclusion

Recycling Free Acid in the autoclave feed suppresses sulphur oxidation. To suppress unwanted sulphur oxidation, acid in the range of from 7 to 60 g/L may be utilized. 20 to 40 g/L Free Acid is preferable.

EXAMPLE 12

The following example demonstrates temperature and pressure conditions utilized during pressure oxidation. The temperatures and pressures utilized for the process reflect physical as well as kinetic constraints. A temperature in excess of about 160° C. in the autoclave leads to the transformation of the byproduct molten sulphur from a watery fluid to a viscous, molasses-like state for which agitation power requirements become far greater and unwanted sulphur oxidation is favored. Thus, a temperature above about 160° C. is undesirable.

Figure 8:
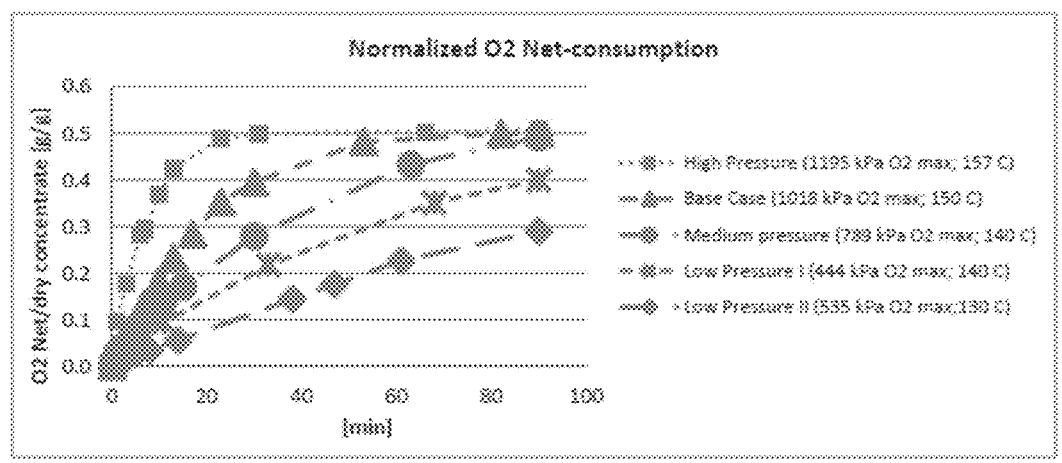
FIG. 8 is a graph showing oxygen consumption during pressure oxidation carried out at different pressures and temperatures.

The lower temperature for the process is constrained by the reaction kinetics. FIG. 8 shows oxygen consumption during pressure oxidation carried out at different pressures and temperatures. In the upper three oxygen consumption curves shown in FIG. 8, pressure oxidation is faster, and reaches an acceptable level for copper recovery within the time of 90 minutes. The lower 2 oxygen consumption curves show that more time in the autoclave is required. For economic reasons, a larger autoclave, which results in a longer retention time is not desirable. Therefore, a temperature of 140° C. or greater is utilized for the pressure oxidation process. Lower solids concentrations are also utilized in the autoclave when lower temperatures are utilized due to heat balance constraints that also increase the cost of the process.

The vessel construction also plays a role in determining the partial pressure of oxygen that can be used. The vapour pressure of steam provides a vapour blanket that mitigates against the chance of a titanium fire in the vessel. Due to the presence of chlorides, titanium is the material of choice, but other metals and alloys also run the risk of igniting during pressure oxidation. Higher oxygen partial pressures increase this risk. Higher oxygen pressures also require thicker walled autoclaves making the autoclave more costly. A compromise is utilized to achieve a relatively high leaching rate without excessive chance of a catastrophic fire in an autoclave.

"Safe" oxygen partial pressures at various temperatures in the autoclave are shown in Table 11.

TABLE 11

O$_2$ Pressure in Autoclave for Safe Operation

| Temperature, ° C. | Maximum O$_2$ Pressure, kPag |
|---|---|
| 130 | 1200 |
| 140 | 1330 |
| 150 | 1510 |
| 160 | 1620 |

FIG. 8 indicates that an oxygen partial pressure of about 700 kPag or greater provides an adequate leach rate during pressure oxidation. The oxygen partial pressure above about 1500 kPag introduces safety concerns and economic considerations because the high pressure would require a thicker walled autoclave.

Conclusion

During pressure oxidation, a temperature in the range of about 140° C. to about 160° C. and oxygen partial pressure in the range of about 700 kPag to about 1500 kPag results in acceptable copper recovery and precipitation of arsenic as scorodite. An oxygen partial pressure of about 1000 kPag provides sufficient oxygen and is generally economically feasible.

The above-described embodiments of the invention are intended to be examples only. Alterations, modifications, and variations may be effected to the particular embodiments by those skilled in the art. Thus, the scope of the claims should not be limited by the embodiments set forth in the examples, but should be given the broadest interpretation consistent with the description as a whole.

The invention claimed is:

1. A process for the extraction of copper from a feed material comprising at least one of arsenic-bearing copper sulphide mineral and antimony-bearing copper sulphide mineral, the process comprising:
fine-grinding the feed material;
after fine-grinding, subjecting the feed material to pressure oxidation in the presence of surfactant and a halogen to produce a product slurry;
subjecting the product slurry to liquid/solid separation to obtain a pressure oxidation filtrate and solids comprising at least one of a compound of arsenic and a compound of antimony;
recovering copper from the pressure oxidation filtrate.

2. The process according to claim 1, comprising subjecting part of the pressure oxidation filtrate to evaporation after recovering copper therefrom and, after evaporation, recycling the part of the pressure oxidation filtrate to pressure oxidation.

3. The process according to claim 1, wherein the solids also comprise copper, and wherein the solids, after liquid/solid separation, are subjected to acidic leaching to dissolve at least some of the copper to produce a copper solution and a solid residue comprising the at least one of a compound of arsenic and compound of antimony; and wherein the copper is further recovered from the copper solution.

4. The process according to claim 1, wherein fine-grinding comprises grinding the feed material to a p80 of about 5 µm to about 15 µm.

5. The process according to claim 1, wherein fine-grinding comprises grinding the feed material to a p80 of about 7 µm to about 10 µm.

6. The process according to claim 1, wherein the surfactant in the pressure oxidation is added in an amount of about 1 kg/t feed material to 10 kg/t feed material.

7. The process according to claim 6, wherein the surfactant includes at least one of lignin sulphonate, quebracho, aniline, or o-phenylenediamine.

8. The process according to claim 1, where the surfactant is o-phenylenediamine in an amount of 1.5 to 3 kg/t concentrate.

9. The process according to claim 1, wherein the halogen is chloride and the pressure oxidation is carried out in the presence of about 3 to 20 g/L chloride.

10. The process according to claim 1, wherein the halogen is chloride and the pressure oxidation is carried out in the presence of about 10 to 12 g/L chloride.

11. The process according to claim 1, wherein the pressure oxidation is effected at a temperature of about 140° C. to about 160° C.

12. The process according to claim 1, wherein the pressure oxidation is effected with a retention time of about 60 to about 120 minutes.

13. The process according to claim 1, wherein the pressure oxidation is effected with a retention time of about 90 minutes.

14. The process according to claim 1, wherein the pressure oxidation is effected at an oxygen partial pressure of about 700 to about 1400 kPa.

15. The process according to claim 1, wherein the pressure oxidation is effected in the presence of a feed acid comprising sulphuric acid in an amount sufficient to limit the oxidation of sulphur in the feed material to sulphate.

16. The process according to claim 1, wherein a ratio of arsenic to iron in combined feed to pressure oxidation including the feed material, surfactant, and halogen, and not including recycled residue, is less than 0.1:1 or between 0.7:1 and 1.3:1.

17. The process according to claim 1, wherein pressure oxidation is effected in the presence of up to 5 kg/t of potassium iodide.

18. The process according to claim 1, wherein pressure oxidation is effected in the presence of up to about 1 kg/t of potassium iodide.

19. The process according to claim 1, wherein part of the solids obtained from the liquid/solid separation is recycled to the pressure oxidation at a solids to arsenic-bearing copper sulphide mineral and/or antimony-bearing copper sulphide mineral ratio of about 0.1:1 to 1.5:1.

20. The process according to claim 19, wherein the ratio is about 1:1.

* * * * *